United States Patent [19]
Conover

[11] Patent Number: 5,980,263
[45] Date of Patent: Nov. 9, 1999

[54] APPARATUS AND METHOD FOR TEACHING LIBERAL ARTS CONCEPTS

[75] Inventor: Karen M. Conover, 412 W. Renrose, Loves Park, Ill. 61111

[73] Assignee: Karen M. Conover, Loves Park, Ill.

[21] Appl. No.: 09/053,581

[22] Filed: Apr. 1, 1998

[51] Int. Cl.⁶ .............................. G09B 3/00; G09B 17/00
[52] U.S. Cl. ............................................ 434/322; 434/178
[58] Field of Search .................................. 434/322, 156, 434/178, 157, 167, 172, 176; 281/51

[56] References Cited

U.S. PATENT DOCUMENTS

| | | | |
|---|---|---|---|
| 890,259 | 6/1908 | Callanan . | |
| 2,504,650 | 10/1950 | Chessrown | 35/35 |
| 3,574,957 | 4/1971 | Bello-Bridick | 35/76 |
| 3,899,838 | 8/1975 | Lalley et al. | 35/31 |
| 4,173,833 | 11/1979 | Rosenblatt | 434/236 |
| 4,690,409 | 9/1987 | Scalia | 273/299 |
| 4,968,255 | 11/1990 | Lee et al. | 434/159 |
| 5,161,976 | 11/1992 | Crowe | 434/159 |
| 5,427,529 | 6/1995 | Dunse | 434/167 |
| 5,484,287 | 1/1996 | Concepcion-Diaz | 434/128 |
| 5,571,019 | 11/1996 | Wilson | 434/207 |

OTHER PUBLICATIONS

*Classrooms That Work,* Second Edition, by Patricia Cunningham and Richard Allington, Copyright 1999. pp. 65–66, ISBN 0–321–01339–5.

Summit Learning Math catalog, p. 30, Clever Catch Balls.

*Primary Examiner*—Robert A. Hafer
*Assistant Examiner*—Kurt Fernstrom

[57] ABSTRACT

A teaching apparatus comprises a three-dimensional geometrical object having a surface divided into a plurality of segments, each of which includes a question relating to a particular field of liberal arts study. In a preferred embodiment of the instant invention, the three-dimensional geometrical object is a sphere, and the plurality of segments are defined by visible lines provided on the sphere's surface. In embodiments of the teaching apparatus of the instant invention, the particular fields of liberal arts study include the fields of music, literature, and art. For each of these embodiments, the particular questions are applicable to approximately any song and artist, story and author, and piece and artist. At least one of the questions used is designed to elicit emotional responses from a user. Alternatively, at least one of the questions is designed to elicit individualized responses from a user. Furthermore, a preferred embodiment of the instant invention includes at least one of the questions which is designed to elicit creative responses from a user.

6 Claims, 2 Drawing Sheets

APPARATUS AND METHOD FOR TEACHING LIBERAL ARTS CONCEPTS

FIELD OF THE INVENTION

This invention relates to educational learning and teaching aids, and more particularly to learning apparatuses designed to allow students to select and answer questions in a game-like setting.

BACKGROUND OF THE INVENTION

Much of teaching and learning involves nothing more than the rote memorization of facts, figures, and dates. Subjects which are amenable to such rote memorization includes the study of simple mathematics, the alphabet, counting, and spelling, as just a few examples. In each of these subject areas, the recognition of the need for repetition and memorization has spawned an entire industry of study aids designed to allow students to continuously practice the particular fact based area in which they are studying. For example, in the subject of mathematics, learning aids such as flash cards, times tables, dice games, and other such products have been developed to aid a student in memorizing the required relationships in rote fashion.

One such device which allows students to master the basic concepts of mathematics is described in U.S. Pat. No. 5,571,019 issued to Wilson on Nov. 5, 1996, for an APPARATUS AND METHOD FOR TEACHING CONCEPTS OF MATHEMATICS. This reference describes the use of a ball having situated thereon certain mathematical problems and solutions framed by a certain colored geometric symbol. This device, as with the use of flash cards, allows a student to randomly receive a mathematical problem and solution for memorization. Unlike most flash cards, however, the Wilson '019 device also establishes certain relationships between the color, geometric symbol, and the type of mathematical problem contained therein.

Similar learning devices for the study of mathematics are marketed in the Spring 1998 edition of the Summit Learning Math Catalog, A Steck-Vaughn Co., under the name CLEVER CATCH for the subjects of addition, subtraction, multiplication, and division. However, the CLEVER CATCH balls do not appear to establish and maintain a fixed relationship between the geometric shape, color, and the type of mathematical problem contained therein. As with the Wilson '019 apparatus, however, these learning aids are limited to the rote memorization of mathematical facts.

While rote memorization of certain facts may be necessary to the proper educational development of our children, such techniques do not allow for the educational development of the whole child. Specifically, these techniques do not allow for the proper emotional development and development of creative thinking skills of a child. In fact, such rote memorization devices tend to stifle a child's creative development because they allow for no creative addition, subtraction, multiplication, or division, nor do they allow for synergism between components when adding numbers. With these devices, two plus two is always four, regardless how one feel about that answer. However, these are the only type of learning aid devices available.

SUMMARY OF THE INVENTION

It is therefore an object of the instant invention to overcome many of these and other problems existing in the art. More specifically, it is an object of the instant invention to provide a new and useful learning apparatus allowing educational development of the whole child. Specifically, it is an object of the instant invention to provide a learning apparatus which allows for the development of a child's creative mind, emotional stability, and sense of individual importance and well being. Additionally, it is an object of the instant invention to provide an educational apparatus which will elicit personalized responses from pupils to allow exploration of their depth of understanding, prior exposure, and emotional feelings related to a particular topic. It is a further object of the instant invention to provide a learning apparatus which children will find enjoyable. Additionally, it is an object of the instant invention to provide a learning apparatus aiding teaching in non-fact specific and quasi-fact subject areas, such as, for example, art, literature, music, religion, history, and other non-mechanical rote memorization type subjects. It is a further object of the instant invention to provide a learning apparatus which is capable of exploring a child's depth of understanding and feeling generated by a story, piece of art, event of history, song, etc., but which is not tied to any one particular story, piece of art, event of history, song, etc.

In view of these objects, it is therefore a feature of the instant invention to provide an apparatus, such as a ball or other three dimensional geometric shape, having on the surface thereof open ended questions specifically designed to elicit individualized responses from students. More particularly, it is a feature of the instant invention to provide a ball with random sections on the surface thereof, each section containing a different questions seeking an individual student's response which is applicable to any literary story, piece of music, artwork, etc.

In a preferred embodiment of the instant invention, a teaching apparatus comprises a three-dimensional geometrical object having a surface divided into a plurality of segments. Preferably, each of the plurality of segments on the surface of the three-dimensional geometrical object includes a question relating to a particular field of liberal arts study, at least one of which is designed to elicit individualized responses from a user. In a preferred embodiment of the instant invention, the three-dimensional geometrical object is a sphere, and the plurality of segments are defined by visible lines provided on the surface thereof.

In an embodiment of the teaching apparatus of the instant invention, the particular field of liberal arts study is the field of literature, and the questions are applicable to approximately any story. In a highly preferred embodiment of the instant invention, at least one of the questions is designed to elicit emotional responses from a user. Alternatively, at least one of the questions is designed to elicit individualized responses from a user. Furthermore, a preferred embodiment of the instant invention includes at least one of the questions which is designed to elicit creative responses from a user.

In an embodiment of the teaching apparatus of the instant invention, the particular field of liberal arts study is the field of art, and wherein the questions are applicable to approximately any work of art and artist. In a highly preferred embodiment of the instant invention, at least one of the questions is designed to elicit emotional responses from a user. Alternatively, at least one of the questions is designed to elicit individualized responses from a user. Furthermore, a preferred embodiment of the instant invention includes at least one of the questions which is designed to elicit creative responses from a user.

In an embodiment of the teaching apparatus of the instant invention, the particular field of liberal arts study is the field of music, and wherein the questions are applicable to approximately any song and artist. In a highly preferred embodiment of the instant invention, at least one of the questions is designed to elicit emotional responses from a user. Alternatively, at least one of the questions is designed to elicit individualized responses from a user. Furthermore, a preferred embodiment of the instant invention includes at least one of the questions which is designed to elicit creative responses from a user.

In an alternative embodiment of the instant invention, a teaching apparatus comprises a ball having a generally radial surface which is divided into segmented portions. A plurality of these segmented portions contain a question, at least one of which is non-factual. Preferably, each of the segmented portions contain surface coloration and have a boundary between these adjacent segmented portions which is indicated by a visible line. As discussed above, at least one of the questions is designed to elicit emotional responses from a user. Alternatively, at least one of the questions is designed to elicit individualized responses from a user. Furthermore, a preferred embodiment of the instant invention includes at least one of the questions which is designed to elicit creative responses from a user.

These and other aims, objectives, and advantages of the invention, will become more apparent from the following detailed detailed description while taken into conjunction with the accompanying drawings.

Figure 1:
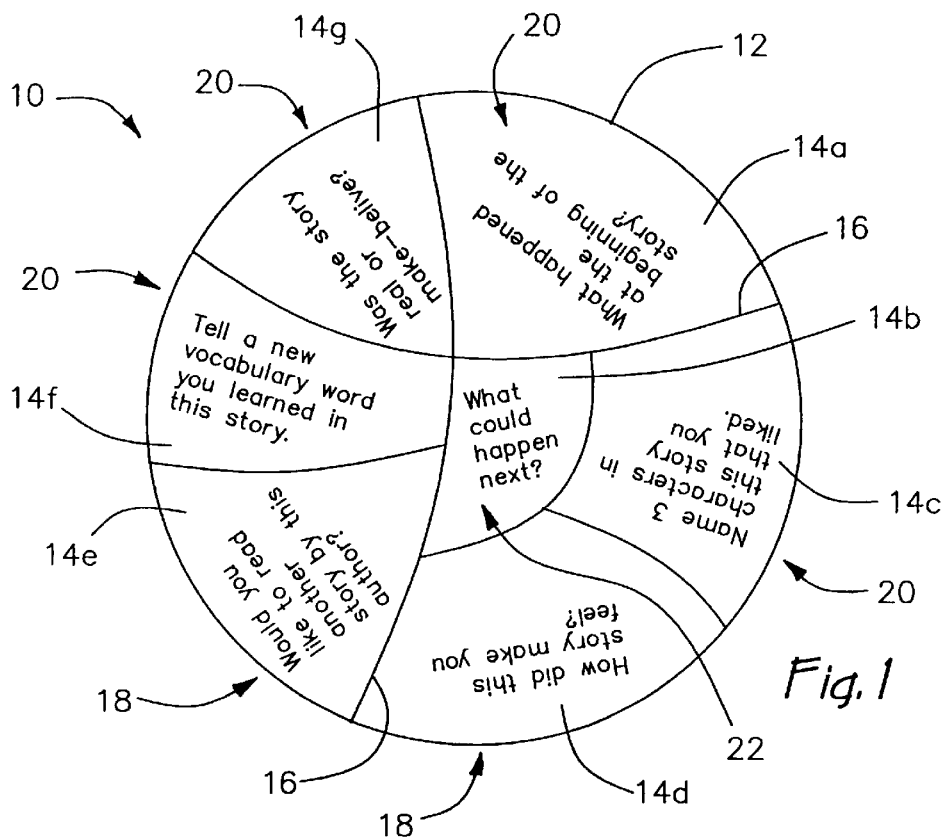
FIG. 1 is a side view illustrating an embodiment constructed in accordance with the teachings of the instant invention.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENTS

In a preferred embodiment of the instant invention, as illustrated in FIG. 1, a teaching apparatus 10 comprises a three dimensional geometrical object, such a ball 12, having a surface which is divided into a plurality of segments 14a–g. Preferably, each of the individual segments 14a–g are defined by visible lines 16 provided on the surface of the ball 12, although other means of visually separating the segments is possible. In a preferred embodiment of the instant invention, each of these segments 14a–g includes a question which relates to a particular field of liberal arts study. In the particular embodiment illustrated in FIG. 1, the field of liberal arts study to which each of the questions relate is the field of literature. Each of the questions is designed to elicit individualized responses from the students with whom the teaching apparatus 10 is used, and is designed to be applicable with any, or approximately any, story.

As discussed above, a child's creative and emotional development, as well as a child's individual self worth and importance should to be developed and not ignored in the educational system. To that end, the teaching apparatus 10 includes questions 18 which are designed to elicit emotional responses from the pupil. These questions 18 are designed to allow a student to identify and vocalize the emotional feelings generated by a particular piece of literature. These types of questions 18 also allow a student to realize that his or her own particular feelings with regard to a piece of literature are important, proper, and have a place. Such teaching fosters a sense of self-worth and self-importance through expressions of the student's own feelings.

Additionally, in a recognition that not all children have shared the same experiences and that not all children have been exposed to the same materials, other questions 20 are designed to elicit individualized responses from the pupil. These questions 20 do not seek a particular right or wrong answer, but ask pseudo-fact based questions whose responses are tailorable to a particular individual student. Such questions allow for an identification of individual perceptions and exposure which, in addition to serving an immediate learning activity, also identifies areas of additional study which may be required for a particular student.

Other questions 22 are designed to elicit creative responses from a pupil to allow a development of the student's imagination and creative skills. These questions 22 also allow a teacher to identify a student's grasp of proper context and flow depending upon the student's creativity and his or her response.

As discussed briefly above, the inclusion of particular questions which are designed to elicit emotional responses from a pupil allow a student to explore the various emotions generated by a particular story, song, or piece of art work depending upon the particular field of liberal arts study under consideration. Such questions are designed to ask the student to express his or her own particular feelings relating to the overall story, particular events within a story, as well as feelings generated by particular characters within a story and the way in which the author portrays them. Such questions may include "How did the story make you feel?", "Did you like the story? Why or why not?", "Did anything in this story make you feel sad?", and "What was the scariest thing or character in the story?" to name but a few examples. Many other particular questions may be designed to fully explore the emotional responses generated by a particular piece of literature as will be apparent to those skilled in the art from the foregoing description.

Also as briefly discussed above, a preferred embodiment of the instant invention may contain at least one questions designed to elicit individualized responses from the students. These questions are non-judgmental in nature and do not penalize the student for any particular response. Such questions are unlike those used in the study of the hard sciences such as mathematics where "individual" responses are strongly discouraged. These questions are designed with the recognition that each individual is different and that his or her opinions and responses are important, not only to that particular student, but also as contributions to the class and society as a whole. Questions of this type may be pseudo-fact based, that is to say that the general responses are somewhat limited to a closed environment of potential factual responses, but are designed to recognize that particular events, characters, etc. may be viewed differently by different students. Examples of such questions include "What happened at the beginning of the story?", "What happened at the end of the story?", "Name something that happened in the middle of the story.", "Name three characters in the story.", "Name the main character of the story.", "Was the story real or make-believe?", "Have you ever read another story like this one?", "What was the problem in the story?", "What was the solution in the story?", "Tell a new vocabulary word you learned in the story.", "Tell the setting of the story." or "Would you like to read another story by this author?" to name just a few. As with the above, numerous modifications of these questions will be apparent to those skilled in the art from the foregoing teaching.

A third set of questions which preferably are included in an embodiment of the teaching apparatus of the instant invention are questions which are designed to elicit creative responses from the pupil. As discussed above, such questions not only allow for the development of a student's creative mind, but also allow an assessment to be made of a child's perception of the events of a particular story through the scope and direction of the child's response. Examples of such questions include "What could happen next?", "How would you change the story?", etc. As with the above, numerous modifications of these questions will be apparent to those skilled in the art from the foregoing description. Additionally, each of these particular questions have been provided by way of example and not by way of limitation.

Figure 2:
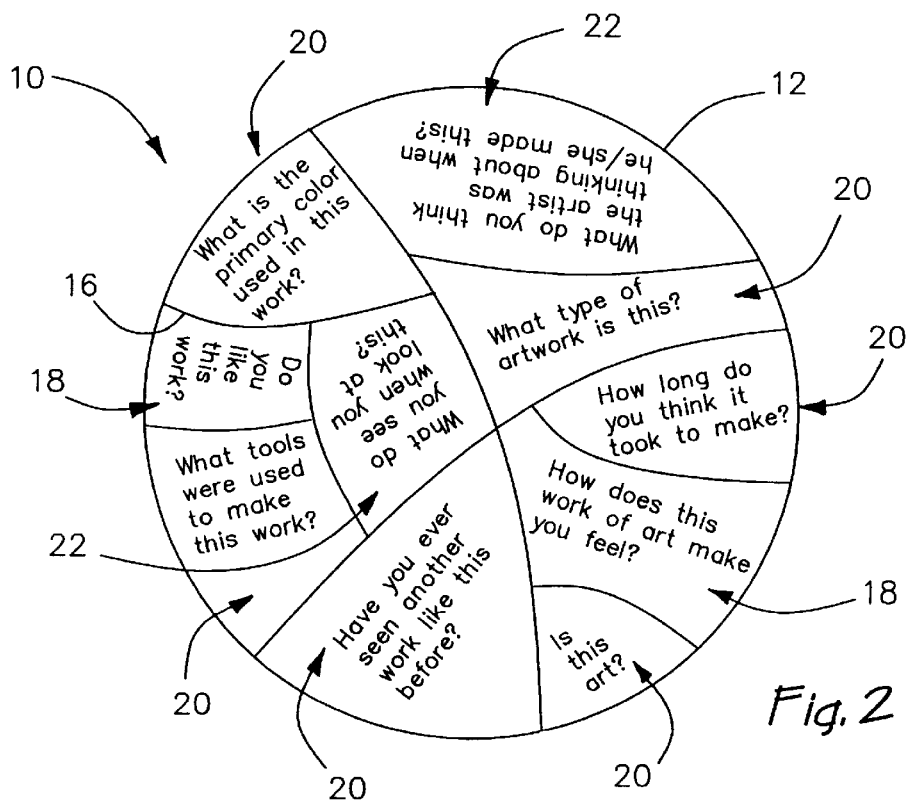
FIG. 2 is a side view illustrating an alternate embodiment constructed in accordance with the teachings of the instant invention.
Figure 3:
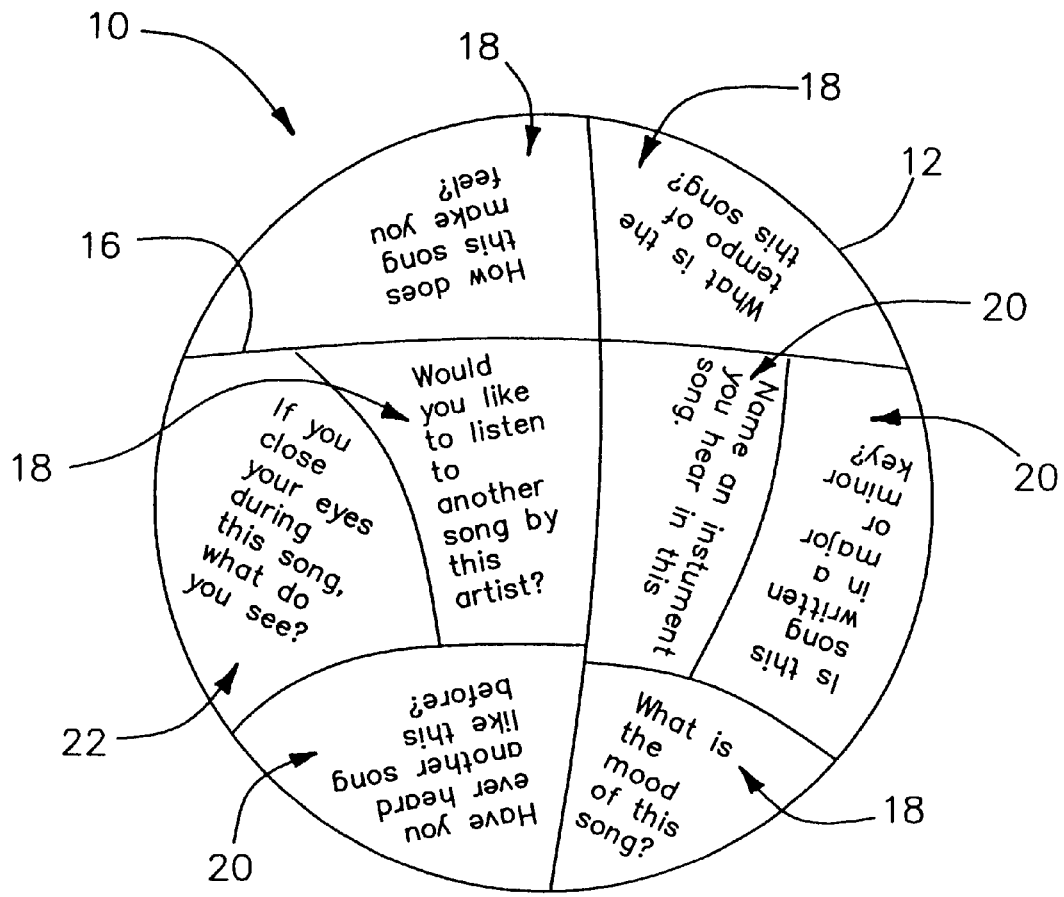
FIG. 3 is a side view illustrating a further alternate embodiment constructed in accordance with the teachings of the instant invention.

An alternative embodiment of the instant invention is illustrated in FIG. 2. This embodiment of the teaching apparatus 10 relates to the particular field of liberal arts study of art. The questions which are included in this embodiment are applicable to approximately any work of art by any artist. As with the embodiment illustrated in FIG. 1, the teaching apparatus illustrated in FIG. 2 utilizes a ball 12 as the particular embodiment of the three dimensional geometrical object, although one skilled in the art will recognize that any three dimensional geometrical object may be utilized. This particular embodiment of the instant invention, while directed to the field of art, utilizes at least one question 18 which is designed to elicit emotional responses from the students. Preferably, this embodiment of the instant invention also includes at least one question 20 which is designed to elicit individualized responses from the students. Further, a preferred embodiment of the instant invention also includes at least one question 22 which is designed to elicit creative responses from the students. As with the questions included in the embodiment of the instant invention relating to the field of literature, each of the questions included on the surface of the teaching apparatus 10 for the embodiment of the instant invention illustrated in FIG. 2 also may be applicable to any particular work of art or artist.

In an alternate embodiment of the instant invention, the teaching apparatus 10 contains questions 18, 20, 22 which relate to the particular field of liberal arts study of music. As with the above embodiments, the usefulness of this embodiment is greatly enhanced by the open-ended nature of these questions which makes the use of this apparatus 10 applicable to nearly any song or artist. Also as with the above embodiments, this teaching apparatus 10 embodies a three dimensional geometrical object as a ball 12, although, as discussed above, one skilled in the art will recognize that any three dimensional geometrical object may be utilized to practice the teachings of the instant invention. This embodiment of the instant invention preferably includes at least one question which is designed to elicit emotional responses from a student relating to a song or piece of music to which the student has listened, or to which the student is currently listening. Preferably, at least one question which is designed to elicit individual responses from a student is also included in this embodiment. Furthermore, this embodiment of the instant invention also preferably includes at least one question which is designed to elicit creative responses from the user. While these questions obviously take different forms than those directed to the other fields of liberal arts study, they are each preferably of a non-factual or quasi-factual nature, allowing a student to fully participate and be rewarded for his own individual responses to the questions contained thereon.

While this teaching apparatus can be used at any time in any particular manner, a preferred method of utilizing this teaching apparatus is to have the students sit or stand in a circle after having read a basil or literature based story, after having listened to a song or piece of music, or after or while observing a piece of artwork. The teaching apparatus 10 is then either bounced or passed by rolling or tossing the apparatus to another student who is expected to catch the apparatus. Preferably the passing or bouncing student first calls out the name of the student to whom the apparatus will be bounced or passed so that that student may be ready to catch the apparatus. Once the receiving student has caught the apparatus, he or she then reads and responds to a particular question on the surface of the apparatus.

The particular method of selecting the question which is to be read and answered by each of the students may vary, but includes selecting the question on which the students right or left hand thumb, index finger, pinkie, etc. is resting. Alternatively, the student may be allowed to read whichever question he or she happens to see first, although this method may generate less variety in the numbers of questions which are asked and responded to.

Numerous modifications and alternative embodiments of the invention will be apparent to those skilled in the art in view of the foregoing description. Accordingly, this description is to be construed as illustrative only and is for the purpose of teaching those skilled in the art the best mode for carrying out the invention. The details of the structure and architecture may be varied substantially without departing from the spirit of the invention, and the exclusive use of all modifications which come within the scope of the appended claims is reserved.

What is claimed is:

1. A method of facilitating a better understanding and appreciation of a work of literature, comprising the steps of:

providing a book;

reading a story from the book;

providing a three-dimensional geometrical object comprising a toy ball and having a surface divided into a plurality of segments, and wherein each of the plurality of segments on the surface of the three-dimensional geometrical object includes a question relating to a work of literature;

playing with the geometrical object;

reading a question from the surface of the geometrical object;

relating the question to the story;

answering the question.

2. The method of claim 1, wherein the step of playing with the geometrical object includes the step of passing possession of the geometrical object from one user to another user.

3. The method of claim 1, further comprising the step of selecting one question from the plurality of segments on the surface of the geometrical object performed before the step of reading the question.

4. The method of claim 1, wherein the step of reading a story comprises the step of reading a story aloud to a plurality of pupils, and wherein the step of playing comprises the step of passing possession of the geometrical object to the plurality of pupils, one at a time, and wherein the step of answering the question comprises the step of generating an individualized response by the pupil in possession of the geometrical object.

5. The method of claim 1, wherein the step of answering the question comprises generating an emotional response from a user.

6. The method of claim 1, wherein the step of answering the question comprises generating an individualized response from a user.

* * * * *